Feb. 13, 1951   T. R. RYMAL   2,541,102
SPECIFIC GRAVITY MEASURING DEVICE
Filed Dec. 7, 1946

T. R. RYMAL
INVENTOR.

BY Lester B. Clark
& Ray L. Smith
ATTORNEYS

Patented Feb. 13, 1951

2,541,102

UNITED STATES PATENT OFFICE 2,541,102

SPECIFIC GRAVITY MEASURING DEVICE

Theodore R. Rymal, Houston, Tex., assignor to Warren Automatic Tool Company, Houston, Tex., a corporation of Texas Application December 7, 1946, Serial No. 714,745

2 Claims. (Cl. 73—32)

This invention relates to a device for determining, at successive intervals, the specific gravity of a liquid and is particularly adapted for use in determining the specific gravity of drilling mud.

In the drilling of wells by the rotary method, it is advantageous to know at all times the characteristics of the mud emerging from the well bore so that the various conditions which develop as the bit passes through different formation may be known and met by controlling the specific gravity of the mud introduced into the well bore.

One of the characteristics of which information is desired is the specific gravity of the mud as it emerges from the well bore so that the operator may determine if the specific gravity is changing as by gas cutting or dilution by water, or both. From a knowledge of the specific gravity of the mud, as it returns from the well bore, disastrous results may be avoided by adding constituents to suit the conditions being encountered.

An object of this invention is therefore to provide a device to constantly indicate and/or record the specific gravity of the mud as it emerges from the well bore.

Another object of the invention is to provide a device for determining the specific gravity of a liquid wherein the liquid within the device actuates the device to automatically effect a flow of the liquid into and out of the device whereby successive determinations are automatically effected.

Still another object is to provide a device for continually measuring and/or recording the specific gravity of liquids wherein the level of the liquid between two vertically spaced points affords a measure of the specific gravity of the liquid in the device.

A still further object is to provide a device of simple construction, and which is easily manufactured, to measure the specific gravity of drilling mud.

A still further and more specific object is to provide a device in which liquid is induced to enter at the lower end and to rise to a predetermined level therein, such liquid being released to discharge under gravity from the device after a measurement of the specfic gravity of the liquid is made.

Other and further objects and advantages of the invention will become apparent with a consideration of the following description and drawings wherein—

Figure 2:
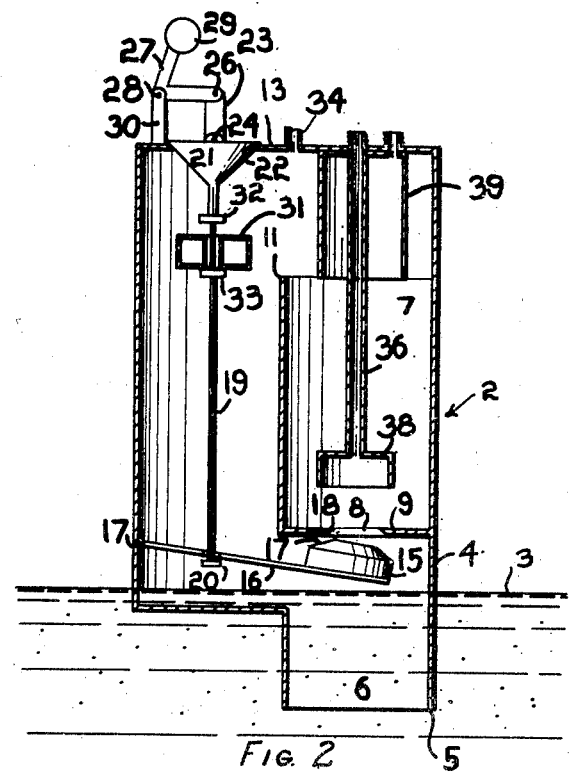
Fig. 2 is a vertical sectional view through an embodiment of the invention.
Figure 1:
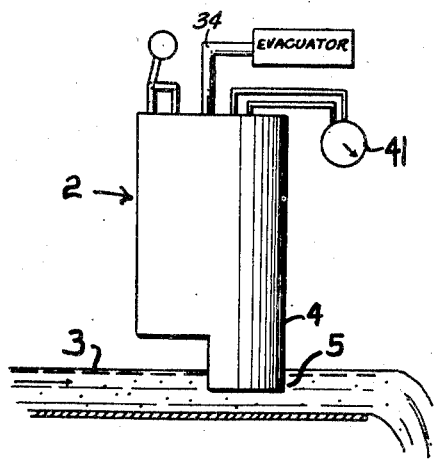
Fig. 1 is an elevation of an embodiment of the device showing it positioned in a mud stream when used for measuring the specific gravity of a drilling mud.

In Fig. 2, the device is denoted generally as 2 and is shown positioned in a stream 3 of the liquid or mud to determine the specific gravity thereof as will be more fully described.

The lower end of the container 4 is shown as terminating in a neck 5 with opening 6 therein to pass the mud or liquid from the stream into the container. Suitable partition means forming a chamber or well 7, are arranged in the container with an opening 8 through the bottom 9 thereof. It is to be noted that this well is so constructed that it terminates at 11, and is in spaced relation with the top 13 of the container 4.

A float valve 15 on the end of the arm 16, which is pivotally connected at 17 to the container 4, is arranged with suitable tapered face 17 to engage the complementary seat 18 on the periphery of opening 8.

A vertical rod 19, with stop 20 at its lower end, extends upwardly through an opening in the arm 16, and terminates at its upper end in valve 21 in opening 22 of the top 13. A link 23 is pivotally connected at 24 to the top of the valve and at 26 to the bell crank lever 27 which is in turn pivoted at 28 upon support 30.

A weight 29 attached to the top arm of the bell crank lever functions to maintain the valve in closed position until it is moved upwardly by the float 31 rising upon liquid within container 4 to engage the stop 32 on the rod 19. It may here be noted that the lowermost position of travel of the float 31 is determined by a guide 33 which is attached to and extends outwardly from the wall of container 4. The rod 19 passes slidingly through the guide 33.

It is intended that mud shall be caused to enter the opening 6 of the container 4 and to rise within the container. To this end there is provided a vacuum connection 34 in the top 13 of the container, and it seems apparent that when valve 21 is closed, a subatmospheric pressure will be created within the container and that liquid from the stream 3 will rise therein. Such influx of liquid will continue until the float 31 engages stop 32 and opens the valve 21.

A stand pipe or pressure line 36 extends down through the top 13 into the chamber or well 7 and terminates in a flared end 38. A similar pipe 39 extends into the container and has its lowermost end at a predetermined height above the opening of the flared end 38. This construction provides vertically spaced points between which a differential pressure exists and may be measured, and measurements of this differential pressure in a manner to now be described, provides a determination of the specific gravity of liquid intermediate these points.

Figure 3:
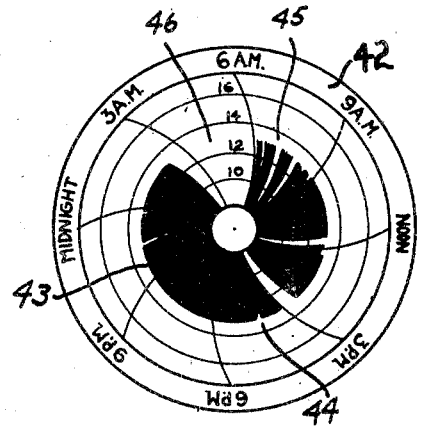
Fig. 3 shows one form of the recording produced in accordance with the invention.

The stand pipes 36 and 39 extend outwardly through the top 13 of the container 4, and are connected to suitable recording means 41 which has a recording sheet 42 such as that shown in Fig. 3.

The recording device may be of any suitable design or construction, such devices being well known in the art, it being preferred that the device shall provide a continuous record of successive measurements made over a period of time.

In use, the device of the invention may be installed at any suitable location where the lower end of container 4 may enter the liquid of which the specific gravity is to be measured. As shown, the device 2 is positioned in a mud stream 3. The valve 21 is in downward or closed position, and the container 4 is ready to receive a charge of mud.

As the mud enters the container, due to the subatmospheric pressure therein obtained by vacuum connection 34, the float valve 15 is moved upwardly to close opening 8 in the bottom of well 7 as liquid rises within the lower portion of the container. This opening in the well being closed, the liquid will then move upwardly in the container 4 and around the well 7 until it reaches the top 11 of the well at which time it will flow over into the well or chamber, whereupon the chamber is progressively filled. The air, or gas trapped in stand pipe 36 will be moved upwardly therein as the level of the liquid in the stand pipe moves upwardly.

As the container continues to fill, a similar pressure will be exerted through stand pipe 39. The differential pressure is therefore obtained at two spaced elevations in the container. This differential pressure causes an excursion of the recording element of the recorder 41 and in this manner the specific gravity of a quantity of liquid in the container 4 is indicated.

When the level of the mud has moved the float 31 upwardly against stop 32, the rod 19 and the valve 21 move upwardly whereby the valve 21 is unseated. The opening of this valve serves to break the vacuum in the container which causes the mud to drain out of the container and from the stand pipe 39 through the opening 6.

When the float valve 15 moves down, the liquid or mud will drain from the well 7. Further movement of the float 15 will cause the arm 16 to contact the stop rest 20 at the lower end of rod 19 thereby moving the valve 21 again into closed position. The container is then ready to receive a new charge of mud.

The float 15 may tend to allow leakage of the fluid from well 7, but in any event, due to its buoyancy, it will not fall to its lowermost position and thereby close valve 21 until the liquid has drained from the device.

As a matter of practical operation, it has been found desirable that about one and one-half minutes be required to fill, dump, and record, or to complete one cycle of operation. By this mode of operation a record such as that shown at 42 in Fig. 3, is provided. Successive excursions of the stylus in making such a record lie closely contiguous and hence portions of the record produced during continuous operation of the device are substantially solid as shown at 43 on the chart 42. If, however, there are variations in the specific gravity of the mud, such variations are made apparent by irregularities 44 in the crest of the graph. The graph also indicates periods of intermittent operation or shut-down of the device as shown at 45 and 46. It is therefore apparent that the graph or record accurately indicates specific gravity at any time and also promptly indicates to the operator any change in mud conditions.

Various modifications of the invention may be practiced without departing from the spirit of the invention.

Broadly the invention contemplates a device of simple construction which is adapted to receive a charge of mud, determine and record the specific gravity thereof, and discharge it in a cycle of operations.

The invention claimed is:

1. A device for determining the specific gravity of a drilling mud comprising, a container having an opening in the top thereof and a second opening therein adjacent its bottom to receive and discharge a quantity of the mud, means for creating a vacuum in the container and inducing through said second opening a quantity of the mud whose specific gravity is being determined, partition means in said container forming a chamber therein having an opening adjacent its bottom, a pair of pressure lines in said container with one of the lines extending downwardly into said chamber and the other line terminating a spaced vertical distance above the first mentioned line, a float valve adjacent the lower end of the container arranged to close said opening in said chamber when the level of the mud rises to a predetermined point in the container, a valve in the top of the container movable to open and close said first mentioned opening, a valve stem extending downwardly from said valve, and a float operatively connected to said valve and stem to lift the valve and break the vacuum when the level of the mud rises to a second predetermined point in the container and to thereby effect discharge of the mud from the container by gravity.

2. A device for determining the specific gravity of a drilling mud comprising, a container having bottom and top openings therein, a valve mounted on the container and movable to open and close the top opening, partition means forming within the container a chamber having an upper opening and a lower opening, a suction connection at the upper end of the container so that applied suction will create a vacuum and cause liquid to rise within the container when the lower end of the container is immersed in the liquid and the valve is closed, a float valve mounted in the lower end of the container and movable to close said lower opening whereby the liquid will rise within the container, enter said upper opening and fill said chamber, a stem on said first mentioned valve extending downwardly and having a loose connection with the float valve, a float operatively connected to said stem in the upper end of the container to lift the stem and valve when the liquid in the container reaches a predetermined level, means biasing said valve in open and closed positions, pressure connections from the exterior of the container to vertically spaced points within the chamber and differential pressure indicating device operatively connected to said pressure connections for indicating the specific gravity of successive quantities of mud sequentially drawn into and discharged from within the container and chamber.

THEODORE R. RYMAL.

REFERENCES CITED

The following references are of record in the file of this patent:

UNITED STATES PATENTS

| Number | Name | Date |
| --- | --- | --- |
| 1,460,134 | Johlin | June 26, 1923 |
| 1,559,421 | Greet | Oct. 27, 1925 |
| 1,612,093 | Bowerman | Dec. 28, 1926 |
| 2,373,795 | Warren | Apr. 17, 1945 |
| 2,434,723 | Shook | Jan. 20, 1948 |
| 2,451,605 | Barnes | Oct. 19, 1948 |